(87.)
JOHN B. WICKERSHAM
Improvement in Lubricators.
No. 4,658. Reissued Dec. 5, 1871.
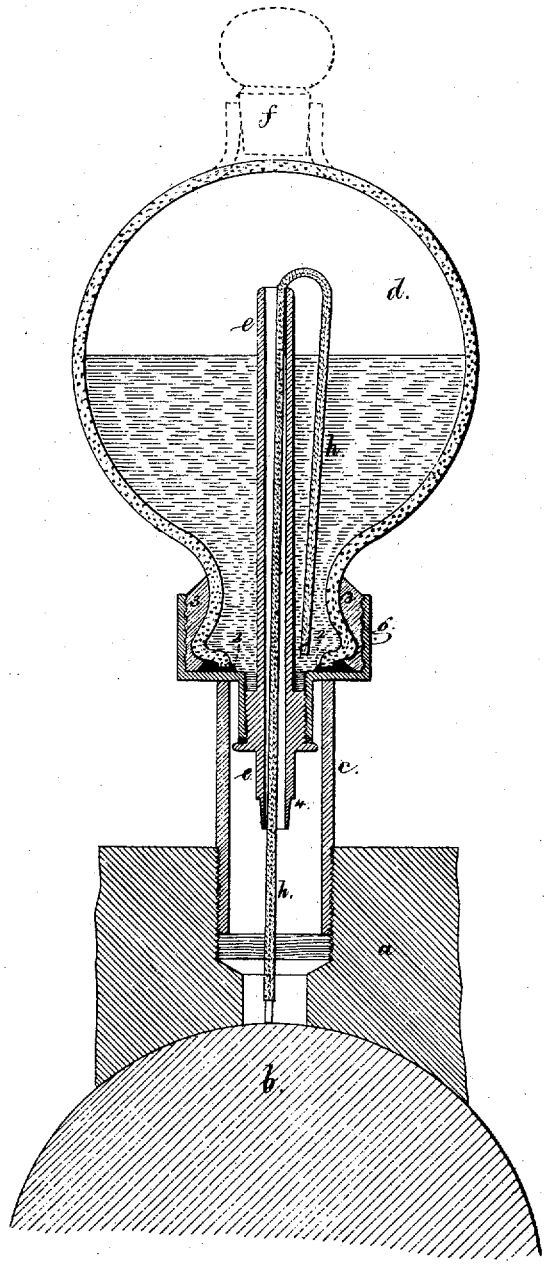
Witnesses
Chas H. Smith
Geo. D. Walker
John B. Wickersham
Lemuel W. Serrell
atty.

UNITED STATES PATENT OFFICE.

JOHN B. WICKERSHAM, OF PHILADELPHIA, PENNSYLVANIA.

IMPROVEMENT IN LUBRICATORS.

Specification forming part of Letters Patent No. 70,058, dated October 22, 1867; reissue No. 4,658, dated December 5, 1871.

*To all whom it may concern:*

Be it known that I, JOHN B. WICKERSHAM, of the city and county of Philadelphia, in the State of Pennsylvania, have invented and made an Improvement in Lubricators; and I do hereby declare that the following is a correct description thereof.

Heretofore oil-holders for journal-boxes have been made of glass; but there has been great difficulty experienced in keeping them in a correct condition for properly supplying the oil. They are apt to be broken when the stem is formed of glass or liable to leak when a metal socket is employed; and if the end of the stem comes into contact with a moving surface, or with the interior of a hole leading to the surface to be lubricated, the oil is very liable to run out of the inverted fountain very quickly, passing along the surfaces in contact, and thus emptying the fountain. Besides this, where brass or other hard metallic connections are employed the glass is liable to be broken by expansion or contraction or by electrical influences, and the oil is injured by contact with such metal.

The present invention is intended to obviate these difficulties by making the fountain perfectly tight with the stem, and providing means for supplying the oil to the moving parts without the risk of the supply being stopped or the oil running out too freely, or the glass broken, or the oil injured by the metal.

In the drawing I have represented a vertical section of my improved lubricator.

*a* represents the portion of the journal-box or machine to which the lubricator is to be attached, and *b* the surface to be lubricated as it revolves or reciprocates. I employ a hollow standard, *c*, for the reception of the lubricator, so as to give room for the stem within it. *d* is the glass fountain, formed as a globular or other-shaped vessel, to be filled by inverting it and unscrewing the stem *e*, or by removing a ground-glass stopper, *f*, shown by dotted lines, which may be provided in the upper part for this purpose. The socket *g* is formed of metal, and to this the stem *e* is connected. I attach the glass fountain to this metal socket *g* by means of sealing-wax, as shown at 2 2, the parts being heated when said wax is applied; this makes a perfectly oil-tight joint. But in order to prevent the parts being disconnected by a jar or blow, I introduce a filling of plaster or similar material around the contracted neck at 3 3, between that and the roughened interior of the socket *g*. This mode of uniting the socket and the reservoir insures great strength and removes liability to leakage, for the glass itself is more liable to break than the sockets to separate. The end of the stem *e* is formed with a contraction, leaving a shoulder at 4, and this prevents the end of the pipe coming into contact with the interior of the hole into which the stem is inserted; hence there will be no tendency of the oil to run down the sides of the said hole; but it will drop from the end of the stem, where simply the stem and inverted fountain are employed, and there will be no tendency of the oil to run rapidly out of the fountain by being conducted off in a small stream to the side of said hole by the contact of the stem therewith. The stem *e* is shown as extended up within the fountain and supplied with a capillary feeder, *h*, that is made of wire, with a fibrous covering, and is bent in the form of a siphon.

Heretofore the oil has been supplied gradually from oil-cups by a wick or piece of fibrous material passing from the bottom of the oil-cup up over the edge of a tube and down through the same; but the fibers are apt to be drawn into the journal, and the wick becomes clogged up with the dirt and gummy matters of the journal. Besides this, these wicks are very troublesome to insert through the tubes of the oiler; also, it is difficult to set the wick to give a proper supply of oil.

To obviate these difficulties I employ wire covered with cotton or similar material, woven or wound upon said wire; and I do not allow the fibrous covering to extend to the surface in motion to be lubricated, but allow the projecting end of the wire to come in contact with the same and conduct the lubricating material from the fibrous covering to the part to be lubricated; hence said fibrous covering does not become soiled or gummed up, and will freely convey the oil to the parts in motion.

I prefer and use the covered wire known as skirt-wire, bent to form the aforesaid capillary. It will be evident that several of these covered wires might be employed, and by their united capacity supply any desired quantity to the part to be lubricated; or the fibrous covering may be made tighter or more loose to effect the same purpose. The metal employed in said lubricator, where the same comes into contact with the oil, is white metal or pewter, which I have discovered will not injure the oil like the brass heretofore employed, and will not cause the glass to break by the expansion or contraction, or by electrical influences.

What I claim, and desire to secure by Letters Patent, is—

1. Securing the glass fountain to the metallic socket, in the manner specified.

2. A movable stem, *e*, constructed as set forth, in combination with the glass fountain and metal socket *g*, as set forth.

3. The wire covered with fibrous material and applied, in the manner specified, to a lubricator, for the purposes set forth.

4. A glass fountain, with a neck on the lower end, secured to a metal socket and rendered oil-tight by sealing-wax melted between the parts.

5. A lubricator with a glass reservoir and metallic connections, made of white metal or pewter, for the purposes and substantially as set forth.

6. A lubricator with a glass reservoir, having a contracted neck at the lower end and a metallic cap attached thereto and receiving a tube of white metal, substantially as set forth.

Signed by me this 7th day of November, A. D. 1871.

JOHN B. WICKERSHAM.

Witnesses:

NORMAN H. STEVENS,

J. J. MCCARTNEY.

(87)